United States Patent [19]

O'Conner

[11] Patent Number: 5,557,281

[45] Date of Patent: Sep. 17, 1996

[54] DEVICE FOR MEASURING THE VELOCITY OF VEHICLES FOR TRAFFIC MONITORING

[76] Inventor: Joe S. O'Conner, Tulpenstrasse 5, 88630 Aach-Linz, Germany

[21] Appl. No.: 372,001

[22] Filed: Jan. 12, 1995

[30] Foreign Application Priority Data

Jan. 12, 1994 [DE] Germany ............. 44 00 624.1

[51] Int. Cl.⁶ .................................. G01S 13/91
[52] U.S. Cl. ............................. 342/114; 342/115
[58] Field of Search .......................... 342/104, 114, 342/115, 69, 194

[56] References Cited

U.S. PATENT DOCUMENTS

| 3,118,139 | 1/1964 | Durstewitz | 342/104 |
| 4,231,039 | 10/1980 | Fritzlen et al. | 342/116 |
| 4,335,382 | 6/1982 | Brown et al. | 342/104 |
| 4,335,383 | 6/1982 | Berry | 342/115 |
| 4,717,915 | 1/1988 | Goede | 342/106 |
| 4,866,438 | 9/1989 | Knisch | 342/66 |
| 4,988,994 | 1/1991 | Loeven | 340/936 |
| 5,262,783 | 11/1993 | Philpott et al. | 342/114 |

FOREIGN PATENT DOCUMENTS 286910 10/1988 European Pat. Off. .
662660 10/1987 Switzerland .

Primary Examiner—Daniel T. Pihulic
Attorney, Agent, or Firm—James Creighton Wray

[57] ABSTRACT

A device for measuring the velocity of vehicles for traffic monitoring a doppler signal transmitter and receiver is used which comprises two mixer diodes arranged to deliver two doppler signals which are dephased against each other by 90°, the one or the other signal leading the other, depending on whether the picked up vehicle approaches or recedes from the doppler signal transmitter is fed into a frequency measuring device for measuring the signal frequency as a quantitative measure for the relative velocity between vehicle and doppler signal transmitter. For this purpose one signal of the doppler signal transmitter and receiver 10 is fed into a phase control circuit 34, the output frequency of which is converted into a voltage proportional to the relative velocity between doppler signal transmitter 10 and monitored vehicle. Furthermore, the two signals of the doppler signal transmitter and receiver are fed into a phase detector 26. The output signals of the phase detector circuit 26 are fed into a directional logic circuit 28 which has two logic outputs 30, 32 at which logic signals appear indicating as to whether the picked up vehicle approaches or recedes. The logic signals from the directional logic circuit 28 are fed into a frequency voltage converter 56. The frequency voltage converter 56 has two outputs 62, 64. A voltage proportional to the relative velocity of the picked up vehicle appears at output 62 when the picked up vehicle approaches. A voltage proportional the the relative velocity of the picked up vehicle appears at output 64 when the picked up vehicle deviates.

6 Claims, 2 Drawing Sheets

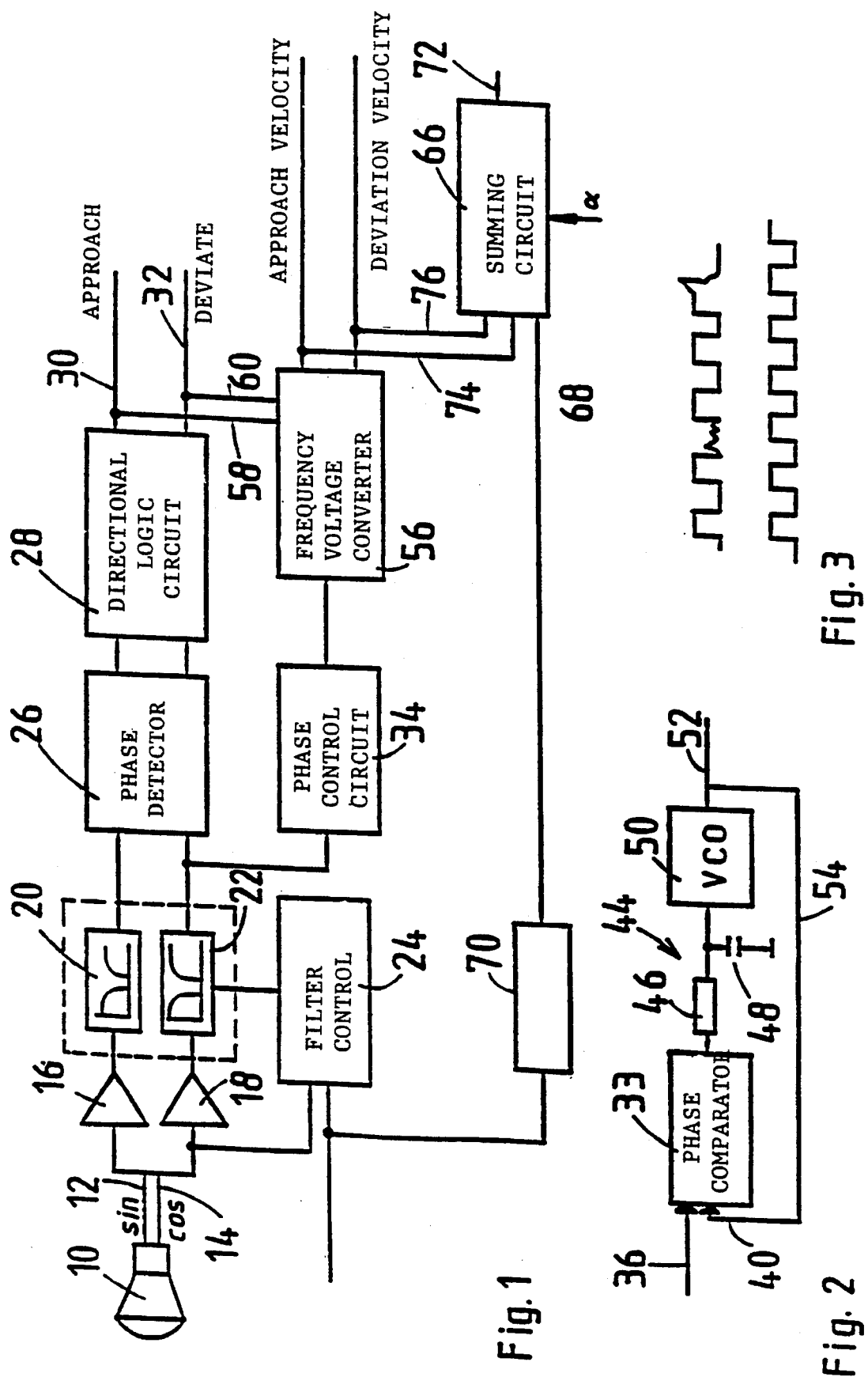

ns two mixer
DEVICE FOR MEASURING THE VELOCITY OF VEHICLES FOR TRAFFIC MONITORING

TECHNICAL FIELD

The application refers to a device for measuring the velocity of vehicles for purpose of traffic monitoring comprising a doppler signal transmitter and -receiver.

BACKGROUND OF THE INVENTION

Measuring the velocity of a vehicle by a radar device is known for the purpose of traffic monitoring. For this purpose the radar device is stationary at the roadside. The radar device comprises a doppler signal transmitter. A measure for the velocity of the monitored and picked up vehicle may be obtained from frequency shift or doppler shift of the reflected radar beam. A camera is released when a speed limit is exceeded. The picture provided by the camera comprises, conclusively, the picture of the vehicle with its license plate and, reflected into the picture, the indication of the radar device (EP-B-0,286,910; CH-A-662,660).

In common radar devices of this kind a relatively high output frequency occurs which is increased or decreased by the doppler frequency, depending on the direction of the vehicle. Several measurements are taken. The measurements are classified and a histogram is obtained. The shape of the histogram allows conclusions as to eventual disturbance which will make the series of measurements void. With radar devices of this kind a determined minimal relative velocity is required between vehicle and radar device with doppler signal transmitter, of e.g. 20 km/h.

Traffic monitoring equipment comprising radar devices is known for DE-A-37 28 401 (=EP-B-0 304 626=U.S. Pat. No. 4,988,994) in which the radar device is arranged in a moving monitoring vehicle. In this case the relative velocity between the vehicle monitored and the monitoring vehicle is measured. A speedometer supplies the velocity of the monitoring vehicle. The absolute velocity of the vehicle monitored is obtained by addition. When this velocity exceeds a speed limit a photograph is taken. In this known equipment care must be taken that the relative velocity of the vehicles does not fall below a predetermined value.

U.S. Pat. No. 4,335,383 discloses a device for measuring the absolute velocity of a moving vehicle from a monitoring vehicle which also is moving. In this case much effort must be taken for frequency shift in order to suppress doppler signals which occur due to movement of the monitoring vehicle towards ground and surroundings.

Furthermore doppler signal transmitters are known comprising two mixer diodes which are arranged in such a way that they deliver two doppler signals which are dephased against each other by 90°. For the time being the one or the other of these signals leads the other, depending on whether the picked up vehicle approaches or deviates from the doppler signal transmitter. These doppler signal transmitters have, until now, not been used for measuring velocities in traffic monitoring.

SUMMARY OF THE INVENTION

It is an object of the present invention to assemble, with simple means, a device for velocity measurement of vehicles using a doppler signal transmitter for the purpose of traffic monitoring. According to the invention the solution of this problem is achieved in that (a) the doppler signal transmitter comprises two mixer diodes arranged in such a way that the deliver two doppler signals which are dephased against each other by 90°, the one or the other signal leading the other, depending in whether the picked up vehicle approaches or deviates from the doppler signal transmitter, (b) a signal from the doppler signal transmitter is fed into a frequency measuring device for measuring the signal frequency as a quantitative measure for the relative velocity between vehicle and doppler signal transmitter.

The doppler signal transmitters which are used here operate in the base band down to zero Hertz. They are able to cover even very small relative velocities. It has come out that doppler signal transmitters of this kind allow for a very accurate measurement of the velocity of the vehicle. By the relative phase relationship of the doppler signals the doppler signal transmitter can distinguish between travelling in different directions. By this considerable sources of fault are eliminated. Measuring takes place continuously. It is not necessary to process a plurality of measurements into a histogram. Signal processing hereby is considerable simplified without loss of accuracy and of conclusiveness.

Embodiments of the invention are subject matters of the subclaims.

An example of the invention is described below with reference to the accompanying drawings.

BRIEF DESCRIPTION OF THE DRAWINGS

FIG. 1 is a block diagram of a device for measuring the velocity of vehicles for the purpose of traffic monitoring using a doppler signal transmitter.

FIG. 2 shows a phase control circuit or phase locked loop circuit as used in the device of FIG. 1.

FIG. 3 shows signal frequencies for demonstration of the effect of the phase control circuit.

DETAILED DESCRIPTION OF THE PREFERRED EMBODIMENTS

Figure 4:
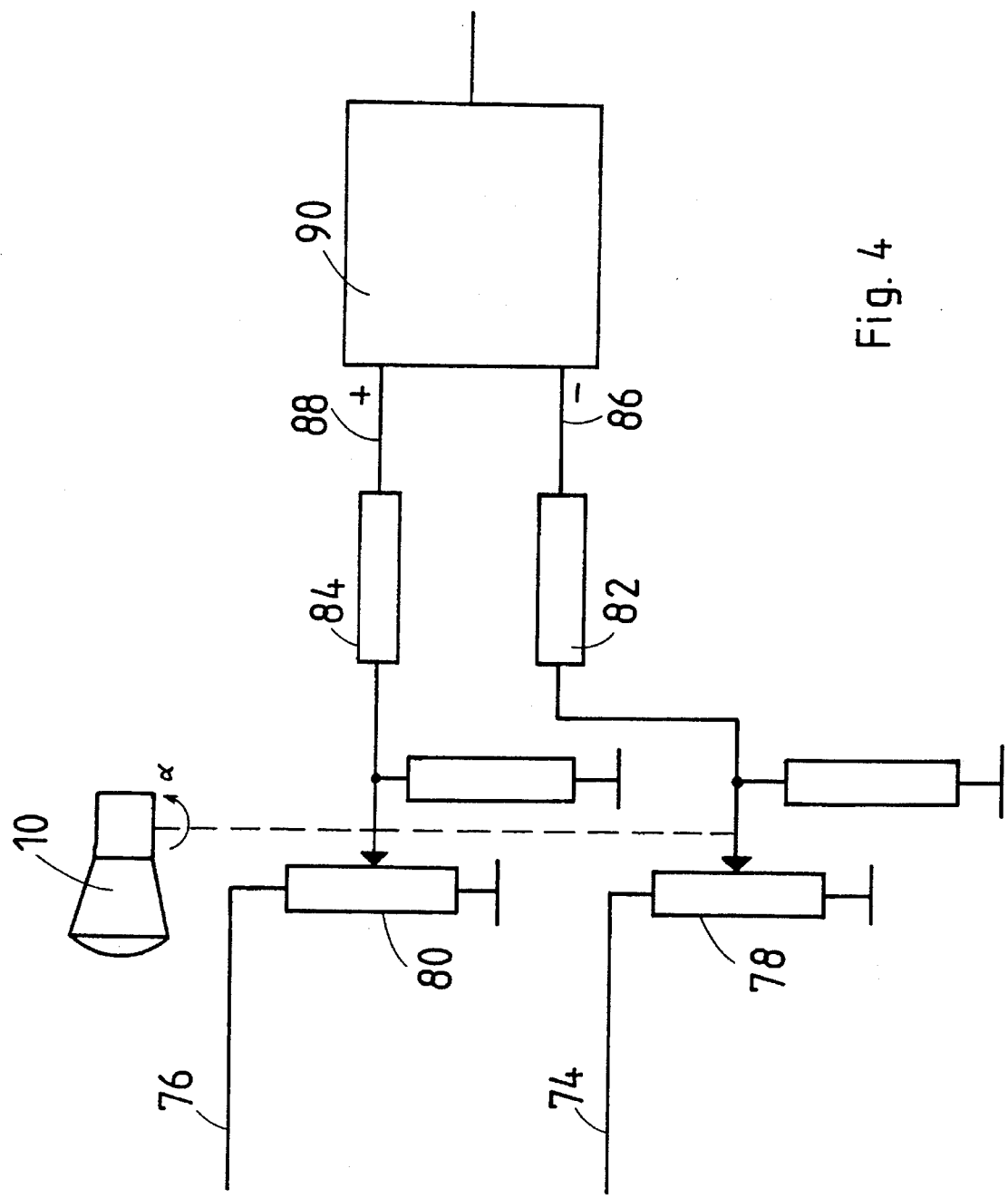
FIG. 4 shows diagrammatically the circuit for automatic consideration of the angle between radar beam and direction of travel.

In FIG. 1 reference numeral 10 indicates a doppler signal transmitter. The doppler signal transmitter 10 comprises two mixer diodes which are arranged in such a way that they deliver at two outputs 12 and 14 two doppler signals which are dephased against each other by 90°. For the time being the one or the other of these signals leads the other, depending on whether the picked up vehicle approaches or deviates from the doppler signal transmitter. The doppler signals at output 12 may be denoted as sinus signal and the doppler signal at output 14 may be denoted as cosinus signal.

The two doppler signals are amplified by amplifiers 16 resp. 18 and are fed into programmable filters 20 resp. 22. Filters 20 and 22 are programmed in such way that they suppress a frequency range which corresponds to the doppler frequencies originated by stationary objects such as road, trees, houses. Trees, e.g. move relatively to the doppler signal transmitter 10 when the monitoring vehicle moves. A doppler signal transmitter which is directed into the direction of travel "sees" the trees coming up to itself. Thereby the doppler signal transmitter supplies a doppler frequency corresponding to the velocity of the monitoring vehicle. Since the doppler frequency is depending from the cosinus of the angle between radar beam and direction of travel, the radar lobe supplies a frequency range of such doppler frequencies. This range of frequencies will be filtered out. The device now responds to those vehicles only which are moving against ground. The programmable filters are controlled by a control device 24 which itself is controlled by a speedometer in the monitoring vehicle. The speedometer may be a conventional speedometer, otherwise it may comprise doppler radar responding to the velocity of the monitoring vehicle against ground. Doppler signals arising from a moving object are fed into a phase detector 26. The phase detector discriminates whether the one or the other doppler signal leads at outputs 12 and 14. From this the conclusion can be taken as to whether the picked up vehicle approaches or deviates. A directional logic circuit supplies corresponding signals to two outputs 30 and 32. When the monitored vehicle approaches, output 30 is "H"; when the vehicle deviates output 32 is "H". The doppler signal from output 14 is tapped off behind filter 22 and fed into a phase control circuit or phase locked loop circuit 34. The phase control circuit 34 produces from the doppler signal sequence of signals of defined frequency which frequency alters very slowly only even in case of frequency fluctuations or other disturbances of the filtered doppler signal.

The phase control circuit or phase locked loop circuit 34 is shown in detail in FIG. 2. A sequence of signals, the frequencies of which may fluctuate or which may show other disturbances, is fed, through an input 36, into the phase control circuit 34 through an input 24. This sequence of signals is fed into a phase comparator 38. Into a second input 40 of the phase comparator 38 is a feedback signal will be fed, as will be described below. In case of a phase anomaly between inputs 36 and 40 the phase comparator 38 supplies a signal of the one or of the other plurality, depending on the direction of the phase shift or displacement. The signal from output 42 of the phase comparator 38 is fed into an integrating network 44 comprising a resistor 46 and a capacitor 48. The integrating network 44 has a high time constant. The voltage existing at capacitor 48 controls a voltage controlled oscillator 50. Oscillator 50 supplies a regular sequence of signals the frequency of which is proportional to the voltage applied. This frequency is present at output 52 and also is fed, through feedback loop 54, into input 40 of the phase comparator 38. Due to the high time constant of the integrating network 44 practically no variations of the output frequency occur when the frequency of the input signal fluctuates or the signal at input 36 is disturbed.

The output frequency of the phase control circuit 34 is fed into a frequency-voltage-converter 56. The frequency voltage converter 56 receives, via lines 58 and 60, the logical signals from outputs 30 resp. 32 of the directional logic circuit 28. The frequency voltage converter 56 supplies a voltage, which is proportional to the output frequency of the phase control circuit 34 therewith to the velocity of the monitored vehicle, either to an output 62 when the monitored vehicle approaches, or to an output 64 when the monitored vehicle deviates.

The two outputs 62 and 64 are connected to a summing circuit 66. Furthermore, a voltage is fed into the input 68 of the summing network 66, which is proportional to the velocity of the monitoring vehicle. This voltage is derived from the speedometer via a converter 70. The voltage at output 62 is deducted from this voltage at input 68. The voltage at output 64 is added to the voltage at input 68. The summing circuit 66 supplies at an output 72 a voltage which represents the absolute velocity over ground of the vehicle monitored.

This does not depend on whether the monitoring vehicle approaches the monitored vehicle, or the monitored vehicle deviates from the monitoring vehicle. Also, the readout is correct when the monitored vehicle is meeting the monitoring vehicle. The relative velocity of the two vehicles may practically be indefinitely small. Insofar the device as described is advantageously different from conventional radar devices in which the relative velocity must not fall below a certain value. This allows free choice of the velocity of the monitoring vehicle, for example to drive just below the speed limit. Also, the device may be used stationary. The monitoring vehicle then is stationary and the voltage at input 68 is zero.

The summing circuit 66 is made up in such a way, that an angle between the radar beam and the direction of travel is taken into account automatically. This part of the summing circuit is represented in FIG. 4.

The outputs 62 and 64 of the frequency voltage converter 56 are fed into the summing circuit via lines 74 resp. 76. The voltages appearing at these outputs 62 and 64 are supplied each to a potentiometer 78 resp. 80. The sliders of the potentiometers 78 and 80 are mechanically connected. Both sliders are mechanically connected with the twistable doppler transmitter and -receiver 10. When the doppler transmitter and -receiver 10 is twisted relatively to the direction of travel, the sliders of the potentiomers 78 and 80 are adjusted. The sliders of the potentiometers 78 and 80 are adjusted. The sliders are in their initial position when the doppler transmitter and -receiver 10 is directed parallel to the direction of travel, in a distance from the end of the potentiometers, so that only a defined fraction of the voltage is taken off the voltage which appears at the frequency voltage converter 56. At twisting, the wipers are adjusted towards the ends of potentiometers 78 and 80 and the voltage taken off is increased by a factor. The potentiometers are adjusted and proportioned in such a way that this factor is approximately 1/cos alpha. The pickoffs of potentiometers 78 and 80 are connected to the inverse resp. non-inverse inputs 86 resp. 88 of a differential amplifier 90 via resistors 82 resp. 84 to the output voltage of which the voltage from input is added.

I claim:

1. Device for measuring the velocity of vehicles for traffic monitoring comprising a doppler signal transmitter and receiver characterized in that
   (a) the doppler signal transmitter and receiver (10) comprises two mixer diodes arranged in such a way that they deliver two doppler signals which are dephased against each other by 90°, the one or the other signal leading the other, depending on whether the picked up vehicle approaches or recedes from the doppler signal transmitter and receiver (10),
   (b) a signal from the doppler signal transmitter and receiver (10) is fed into a frequency measuring device (34, 56) for measuring the signal frequency as a quantitative measure for the relative velocity between vehicle and doppler signal transmitter and receiver (10).

2. Device as claimed in claim 1
   characterized in that
   a signal from the doppler signal transmitter and receiver (10) is fed into a phase control or phase locked loop circuit (34) the output signal of which is, by means of a frequency voltage converter (56) convertible into a voltage proportional to the relative velocity between doppler signal transmitter and receiver (10) and monitored vehicle.

3. Device as claimed in claim 2 characterized in that
- (a) the two signals of the doppler signal transmitter and receiver (10) are fed into a phase detector (26) and
- (b) output signals of the phase detector (26) are fed into a directional logic circuit (28) having two logic outputs (30, 32) at which logic signals appear indicating as to whether the picked up vehicle approaches or recedes.

4. Device as claimed in claim 3 characterized in that
- (a) the logic signals of the directional logic circuit (28) are fed into the frequency voltage converter (56),
- (b) the frequency voltage converter (56) has two outouts (62, 64) and a voltage proportional to the velocity of the picked up vehicle relatively to the doppler signal transmitter and receiver of the picked up vehicle appears at one output (62) when the picked up vehicle approaches and at the other output (64) when the picked up vehicle deviates.

5. Device as claimed in claim 4 characterized in that
- (a) the doppler signal transmitter and receiver (10) is mounted in or on a monitoring vehicle,
- (b) a speedometer for determination of the intrinsic velocity of the monitoring vehicle is provided in the monitoring vehicle,
- (c) the phase detector (26) is preceeded by programmable filter means the limit frequency of which is controllable by the speedometer in such a way that signals which are due to the intrinsic velocity of the monitoring vehicle relative to surroundings are filtered out, and
- (d) the speedometer furthermore is connected with a summing circuit (66), which also is connected with the outputs (62, 64) of the frequency voltage converter (56) for generating for readout a signal indicating the absolute velocity of the vehicle monitored.

6. Device as claimed in claim 5 characterized in that
the summing circuit (66) comprises means (78, 80) for multiplication of signals from outputs (62, 64) of the frequency voltage converter (56) with the reciprocal value of the cosine of the angle alpha between the radar beam and the direction of travel of the picked up vehicle.

* * * * *